United States Patent [19]
Johnson et al.

[11] 3,940,050
[45] Feb. 24, 1976

[54] METHOD OF JOINING DIAMOND TO METAL

[75] Inventors: Donald R. Johnson; James R. Sawers, Jr., both of Wilmington, Del.

[73] Assignee: E. I. Du Pont de Nemours and Company, Wilmington, Del.

[22] Filed: Oct. 4, 1974

[21] Appl. No.: 512,044

Related U.S. Application Data

[62] Division of Ser. No. 333,144, Feb. 16, 1973, Pat. No. 3,856,480.

[52] U.S. Cl. ............... 228/122; 228/903; 228/124
[51] Int. Cl.² .......................................... B23K 31/02
[58] Field of Search ............ 228/122, 123, 124, 903

[56] References Cited
UNITED STATES PATENTS

| | | | |
|---|---|---|---|
| 2,961,750 | 11/1960 | Bender | 228/122 X |
| 3,192,620 | 7/1965 | Huizing et al. | 228/122 |
| 3,678,568 | 7/1972 | Knippenburg et al. | 228/122 |

*Primary Examiner*—Al Lawrence Smith
*Assistant Examiner*—Margaret M. Joyce

[57] ABSTRACT

Disclosed herein is an improved method for joining diamond to metal using a gold-tantalum or gold-niobium solder. The method utilizes powdered material, and a clamp to keep the diamond in place during the soldering step. The article produces has higher mechanical stability than articles produced by known procedures.

5 Claims, 3 Drawing Figures sion. The process proceeds by placing a first
3,940,050

METHOD OF JOINING DIAMOND TO METAL

This is a divisional of application Ser. No. 333,144, filed on Feb. 16, 1973, now U.S. Pat. No. 3,856,480.

BACKGROUND OF THE INVENTION

1. Field of the Invention

This invention relates to a method for joining a diamond to a metal and to the article of manufacture produced by such a method. The article of manufacture is useful as a tool such as a machine tool or a microtome blade.

2. Discussion of the Prior Art

It is well known that metals do not generally provide satisfactoy junctions to diamonds. This is primarily due to the fact that in the fluid state, most metals do not wet the diamond, or wet it inadequately, so that an adhesive joint is difficult to form. There are exceptions to this. In particular, a satisfactoy method of joining diamonds to metal is described in U.S. Pat. No. 3,192,620 which issued to Huizing et al on July 6, 1965. Huizing et al discovered that a very satisfactory adhesive junction between a diamond and a metal can be obtained by using as a solder an alloy of gold containing at least 1 percent by weight of tantalum and/or niobium. The alloy disclosed in Huizing et al is the alloy used in the present invention.

For many purposes, however, the knowledge that a strong bond between a metal and diamond can be formed using this particular alloy is not enough to allow one to make useful articles of manufacture in a commercially feasible fashion. For example, the temperature at which the alloy melts is near or above the graphitization temperature of diamond, depending on the alloy composition. To achieve best results, then, the alloy must be heated very rapidly to its melt temperature and then cooled very rapidly. Induction heating is a common way, and in fact the preferred way, of achieving rapid heating. It has been observed that during the heating step, particularly heating by induction, the diamond will move unless it is held in place. Even with clamping, some rotation of the diamond may occur. This means that if one wishes to orient a particular surface of the diamond relative to a particular surface of the metal shank, some means must be provided to prevent movement of the diamond.

In addition to this, when the shank and the diamond are to be ground to produce an exposed, sharp cutting edge on the diamond, a particularly effective bond must be achieved between all opposed surfaces of the diamond and the metal shank. If not, the vibrations which occur during the grinding step will cause fractures or cleavages to appear in the diamond either during or after manufacture and therefore ruin the cutting ability of the diamond edge.

SUMMARY OF THE INVENTION

The present invention is directed to an improved process for joining a diamond to a metal shank of the type comprising the step of applying an alloy selected from the group consisting of gold-tantalum alloys containing about 1 to about 25 percent by weight of tantalum, and gold-niobium alloys containing from about 1 to about 10 percent by weight of niobium to opposing surfaces of the diamond and the metal shank, and then melting the alloy in an inert environment, such as rare gas or vacuum. The process proceeds by placing a first layer of the alloy and then a diamond in a depression formed in a metal shank, filling the space around the diamond with an inert powdered material, covering the diamond and the powdered material with a second layer of alloy, and clamping the above constituents in place with a metal cap using sufficient force to prevent movement of the diamond during the melting of the alloy.

The article of manufacture produced by this process comprises: a metal shank; an alloy selected from the group consisting of gold-tantalum alloys containing from about 1 to about 25 percent by weight of tantalum, and gold-niobium alloys containing from about 1 to about 10 percent by weight of niobium; an inert powdered material, having a melting temperature above the melting temperature of said alloy, dispersed in at least a portion of said alloy; and a diamond, adhered to the metal shank by said alloy at all opposed surfaces of the metal shank and the diamond.

The powdered material used in the present invention must be inert in the sense that it cannot interfere with the bonding ability of the soldering alloy. In the preferred embodiment, it is a metal powder, such as a powder of molybdenum. It is also preferable that the powdered material is a material that does not melt at the temperature at which the solder melts. In the most preferred embodiment, the metal shank, the powdered material, and the metal cap are all made from the same material. If the article of manufacture is to be used as a tool, the process encompasses the further step of grinding the shank and the diamond to form an exposed cutting surface on the diamond. The article of manufacture formed by the process described above is one which is far more stable against mechanical destruction, particularly during manufacture and use, than those manufactured according to any other known process.

BRIEF DESCRIPTION OF THE DRAWINGS

The present invention can best be described with reference to the following drawings in which.

DESCRIPTION OF THE PREFERRED EMBODIMENT

Figure 1:
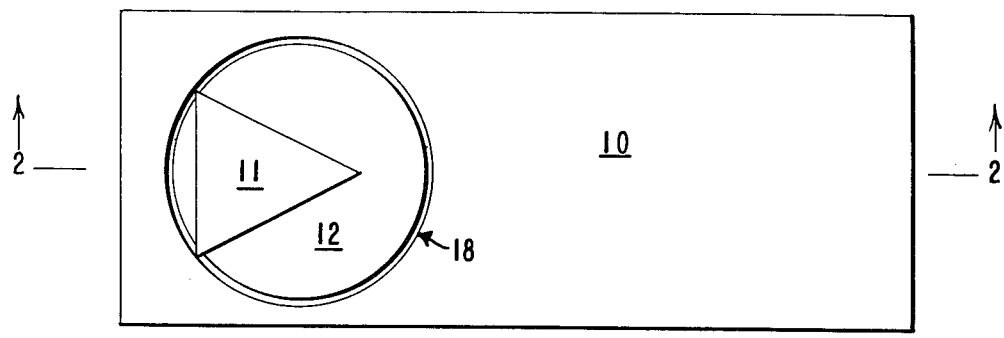
FIG. 1 is a planned view showing how the metal alloy and the diamond are placed in the depression formed in the metal shank during the first stages of manufacture.

In FIG. 1, a depression 18, in a form of a square shouldered blind hole, has been formed in metal shank 10. Metal shank 10 can be made from widely varying metals, but it is preferably made from metals whose thermal coefficient of expansion approximates that of diamond (e.g., molybdenum). One or a number of sheets 12 of the alloy material are placed in depression 18 and a diamond chip 11 is placed on top of the alloy sheet. In the embodiment shown, the diamond is in the form of a trigon whose major faces are cleavage planes and are oriented parallel to the bottom of the blind hole. In the embodiment illustrated, this is to so that when grinding takes place, the exposed cutting edge of the diamond parallel to that edge of the shank will be relatively hard crystalographically. The diamond can, however, be oriented in any desired direction. The important factor is not how the diamond is oriented or shaped originally but the fact that the original orientation of the diamond is maintained.

Figure 2:
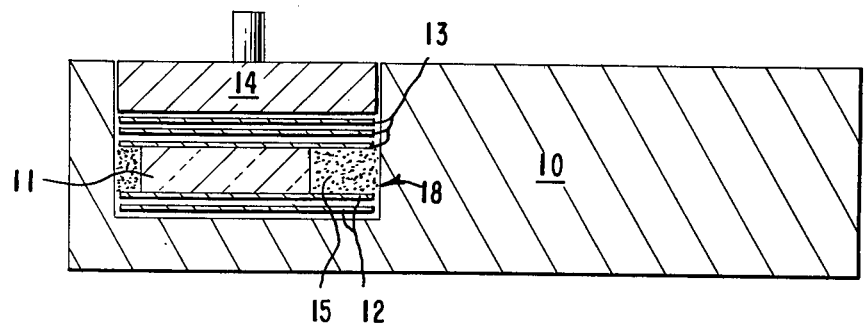
FIG. 2 is a cutaway cross sectional side view showing how each of the constituents used to adhere the diamond to the metal shank are disposed within the depression formed in the metal shank during a later stage of manufacture.

A powdered material, shown generally by the numeral 15 in FIG. 2, is then deposited around the diamond so that it occupies that space, in the plane of the diamond, which is not actually occupied by the diamond. In practice, the powder is packed down around the diamond so that it holds the diamond securely in place. Any type of inert powdered material, such as powdered molybdenum, can be used. In the preferred embodiment, however, the powder is made from the same material that the shank is made from. The powder can have grain size limited only by the need to have a plurality of powdered grains surrounding the diamond. The preferred range, however, is from about 1 to about 10 microns.

After the powder has been packed down around the diamond, one or more sheets 13 of the alloy are placed on top of the diamond and the powdered material and a metal cap 14 which fits snugly in the blind hole 18 is placed on top of the second layer of alloy. Metal cap 14 can be made from any suitable metal material, but again in the preferred embodiment, it is made from a material similar to that from which the shank is made.

The next step in the process is to heat the entire structure up to a temperature at which the alloy will melt. During this step in the procedure, pressure is applied between cap 14 and metal shank 10 to clamp the diamond in place and to force the molten alloy into all portions of the cavity formed by the metal shank 10 and the metal cap 14, particularly the interstitial regions between the powdered material 15. The pressure applied depends on the circumstances, but a pressure of a few grams per square centimeter is sufficient.

Since the materials used are reactive at alloy melting temperatures, the melting operations should be effected in an inert environment such as can be obtained in a vacuum (e.g., $10^{-3}$ mm. of Hg) or in a rare gas atmosphere. The melting point of the alloy depends upon the concentration of tantalum or niobium in the gold alloy. At or below 25 percent by weight of tantalum, or 10 percent by weight of niobium, melting will occur at temperatures between 1100°C. to 1300°C. Higher temperatures can be used, however, if necessary. Heating can be accomplished in any convenient fashion, with the most rapid heating process being desirable to avoid graphitization of the diamond. In this context, induction heating is preferred.

After the structure has been heated above the melting point of the alloy and cooled to room temperature, the metal cap 14 becomes part of the metal shank 10 so that the diamond chip 11 is completely encapsulated by a material 16 which is in turn encapsulated by the metal shank 10. The material 16 provides the adhesion between the diamond chip and the metal shank and is composed in part of the alloy and in part of the alloy with dispersed powdered material therein.

Figure 3:
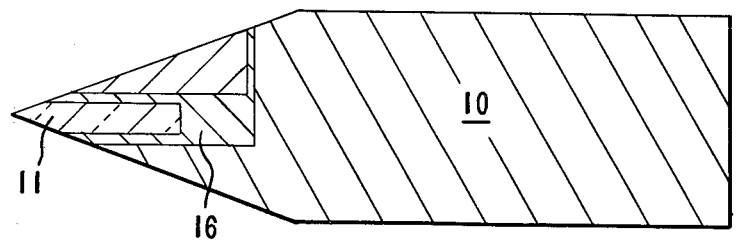
FIG. 3 is a cutaway cross sectional side view of the completed article of manufacture showing how the diamond which has been adhered to the metal shank has been ground away to form an exposed cutting surface on the diamond.

To produce the useful tool from the structure, the metal shank 10 is ground and polished as shown in FIG. 3 to expose a portion of the diamond 11 which is in the form of a cutting edge.

EXAMPLE

A molybdenum shank, 0.3 inch wide by 1.0 inch long by 0.1 inch thick, was prepared by forming a blind hole 0.28 inch in diameter and 0.065 inch deep in one end of the shank. Two sheets of alloy material with diameters slightly less than the diameter of the hole in the shank and a thickness of 0.003 inch were then placed in the hole. The alloy comprised 95 percent gold and 5 percent tantalum. A diamond trigon, with edge lengths of 4.0 mm. and a thickness of 0.6 mm., was then placed on top of the alloy sheets, with one edge of the diameter adjacent to and parallel to the end of the shank nearest to the hole. One hundred mesh molybdenum powder was then packed into the space around the diamond and three more sheets of alloy material were placed on top of the diamond and powdered material. Finally, a metal cap, formed to fit snugly in the hole, was placed on top of the upper layer of alloy. A force of 10 grams was applied between the metal cap and the bottom of the shank. The entire system was heated to a temperature of 1300°C. for 5 seconds at a vacuum of $10^{-5}$ Torr. The article was allowed to cool and was then ground, using conventional grinding techniques, to form a sharp, exposed cutting edge on the diamond.

What is claimed is:

1. In a process, for joining a diamond to a metal shank, of the type comprising the steps of applying an alloy selected from the group consisting of gold-tantalum alloys containing from about 1 to about 25 percent by weight of tantalum, and gold-niobium alloys containing from about 1 to about 10 percent by weight of niobium to opposing surfaces of said diamond and said metal shank, and melting said alloy in an inert atmosphere; the improvement wherein said process proceeds by placing a first layer of said alloy and then said diamond in a depression formed in said metal shank, filling the space around said diamond with an inert powdered material, covering said diamond and said powdered material with a second layer of said alloy, and clamping the above constituents in place with a metal cap using sufficient force to prevent movement of said diamond during the melting of said alloy.

2. The process of claim 1 wherein said powdered material is a metal powder.

3. The process of claim 1 wherein said metal shank, said powdered material and said metal cap are all made from the same metal.

4. The process of claim 1 wherein said powdered material is molybdenum powder.

5. The process of claim 1 further comprising the step of grinding said shank and said diamond to form an exposed cutting surface on said diamond.

* * * * *